US006857656B2

(12) United States Patent
Yasui

(10) Patent No.: US 6,857,656 B2
(45) Date of Patent: Feb. 22, 2005

(54) OCCUPANT DETECTION SYSTEM

(75) Inventor: Katsuaki Yasui, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 12 days.

(21) Appl. No.: 10/303,901

(22) Filed: Nov. 26, 2002

(65) Prior Publication Data

US 2003/0230880 A1 Dec. 18, 2003

(30) Foreign Application Priority Data

Jun. 13, 2002 (JP) ........................................ 2002-172307

(51) Int. Cl.$^7$ ............................................. B60R 21/32
(52) U.S. Cl. ...................................... 280/735; 180/272
(58) Field of Search ........................ 280/735; 180/272; 701/45

(56) References Cited

U.S. PATENT DOCUMENTS

| | | | | |
|---|---|---|---|---|
| 5,702,123 A | * | 12/1997 | Takahashi et al. | .......... 280/735 |
| 5,927,752 A | * | 7/1999 | Brandin | ...................... 280/735 |
| 6,027,138 A | * | 2/2000 | Tanaka et al. | .............. 280/735 |
| 6,113,137 A | * | 9/2000 | Mizutani et al. | ............. 280/735 |
| 6,220,627 B1 | * | 4/2001 | Stanley | ........................ 280/735 |
| 6,275,146 B1 | * | 8/2001 | Kithil et al. | ............. 340/425.5 |
| 6,302,438 B1 | * | 10/2001 | Stopper et al. | ............. 280/735 |
| 6,313,739 B1 | * | 11/2001 | Roth et al. | ............. 340/426.26 |
| 6,393,133 B1 | * | 5/2002 | Breed et al. | ................. 382/100 |
| 6,422,598 B1 | * | 7/2002 | Yasui | .......................... 280/735 |

FOREIGN PATENT DOCUMENTS

JP                 08-169289              7/1996

* cited by examiner

Primary Examiner—Faye M. Fleming
(74) Attorney, Agent, or Firm—Sughrue Mion, PLLC

(57) ABSTRACT

To provide an occupant detection system including a sensor for detecting an object in a plurality of predetermined regions by irradiating a plurality of light beams with different predetermined inclination angles toward a seat direction, the sensor being mounted to a ceiling of a vehicle and a control unit which, based upon a detection output of the sensor, determines that the seat is vacant if the number of the predetermined regions where the object is detected is below a predetermined number and determines that an occupant is seated in the seat if the number of the predetermined regions where the object is detected is the predetermined number or more.

6 Claims, 4 Drawing Sheets

OCCUPANT DETECTION SYSTEM

BACKGROUND OF THE INVENTION

1. Field of the Invention

The present invention relates to an occupant detection system for detecting whether an occupant is present or absent in a vehicle, which is used for a system such as an air bag system for protecting an occupant at the time of a vehicle collision. In particular, the present invention relates to an occupant detection system mounted to a vehicle such as an automobile, which provides information as to whether an occupant is present or absent in a vehicle, the information being utilized for controlling: an air bag system for protecting an occupant at the time of a vehicle collision; an air conditioning system for controlling temperature inside a vehicle; an alarm system for warning an occupant of a critical condition such as his/her dozing; and the like.

2. Description of the Related Art

An air bag is used for protecting an occupant by immediately expanding between a steering wheel or a dashboard and the occupant at the time of a vehicle collision. However, there is a case where a driver is seated in a position close to the steering wheel because the driver is short or a case where a child stands in front of a front passenger seat. In such cases, a distance between the steering wheel or the dashboard and the occupant is extremely short. Thus, it is known that the expansion of the air bag causes damage to the occupant.

Also, in the case where the occupant in the front passenger seat is a child at the age of six or below, even when being seated in a normal position, it is presumed that it is safer not to expand the air bag. Therefore, in the United States, legislation enforcing obligatory installation of the occupant detection system in an occupant protection system using an air bag is the current tendency. As the occupant detection system that can be used for the occupant protection system, for example, a system described in Japanese Patent Laid-open No. 08-169289 is known.

A conventional occupant detection system is described with reference to the accompanying drawing. FIG. 4 is a diagram showing the structure of the conventional occupant detection system described in Japanese Patent Laid-open No. 08-169289.

In FIG. 4, reference numeral 10 denotes a vehicle such as an automobile; 11, a seat such as a driver seat or a front passenger seat which is provided in the vehicle 10; 12, an occupant seated in the seat 11; 13, a steering wheel; 14, an air bag provided inside the steering wheel 13 or in the dashboard at the front passenger seat 11; and 15, a distance sensor which is provided on a front ceiling of the vehicle 10 and faces in the direction of the seat 11. Symbol 16a denotes a seat position sensor for detecting a position along the front and rear direction of the seat 11, and symbol 16b denotes a seat position sensor provided in the seat back cushion of the seat 11 for detecting a reclining angle thereof.

Next, the operation of the occupant detection system of the conventional system will be described with reference to the drawing.

In the case where the seat 11 is vacant, the distance sensor 15 detects the position of the seat 11, and in the case where the occupant 12 is seated in the seat 11, the distance sensor 15 detects the position of a front surface of the occupant 12. When the detected position is too close to the air bag 14, expansion of the air bag 14 is judged to be more dangerous. Thus, even in the case of a frontal collision of the vehicle 10, the air bag 14 is restrained from expanding.

Also, in the case where the position obtained by the distance sensor 15 is identical to the position obtained from outputs of the seat position sensors 16a and 16b, it is judged that the occupant 12 is absent. In the case where the two positions are different, it is judged that the occupant 12 is present.

In the case of the frontal collision of the vehicle 10, it is necessary that, if the occupant 12 is present, the air bag 14 be expanded to thereby protect the occupant 12. However, it is uneconomical to expand the air bag 14 even in the case of the absence of the occupant 12. Therefore, in the case where the above-described judgment results in the absence of the occupant 12, the air bag 14 is restrained from expanding. As a result, the wasteful repair cost can be saved.

In the conventional occupant detection system described above, there is a problem in that in order to judge whether the occupant 12 is present or absent, besides the distance sensor 15 provided to the ceiling, it is necessary to provide the seat position sensors 16a and 16b in the seat 11 and long wirings for integrating the outputs of the seat position sensors 16a and 16b installed apart from each other.

Further, there is another problem in that the wirings are long, thereby causing inconvenience of mounting the system to the vehicle 10, which results in poor mounting property.

SUMMARY OF THE INVENTION

The present invention has been made in order to solve the aforementioned problems and has an object to obtain an occupant detection system which is mounted in one place with an excellent mounting property.

An occupant detection system according to the present invention includes: a sensor for detecting an object in a plurality of predetermined regions by irradiating a plurality of light beams with different predetermined inclination angles toward a seat direction, the sensor being mounted to a ceiling of a vehicle; and a control unit which, based upon a detection output of the sensor, determines that the seat is vacant if the number of the predetermined regions where the object is detected is below a predetermined number and determines that an occupant is seated in the seat if the number of the predetermined regions where the object is detected is the predetermined number or more.

Accordingly, there is an effect in that only counting the number of the regions makes it possible to detect whether the occupant is present or absent.

Further, an occupant detection system according to the present invention includes: a first object detection sensor for detecting an object in a plurality of first object detection regions by irradiating a plurality of infrared beams with different predetermined inclination angles toward a seat direction, the first object detection sensor being mounted to a ceiling of a vehicle; a second object detection sensor for detecting the object in a plurality of second object detection regions whose positional phases are shifted with respect to the plurality of the first object detection regions by irradiating a plurality of infrared beams with different predetermined inclination angles toward the seat direction, the second object detection sensor being mounted to the ceiling of the vehicle; and a control unit which, if detection outputs from the first and second object detection sensors are different, determines that one of the first and second object detection sensors malfunctions.

Accordingly, there is an effect in that the malfunction of the occupant detection system is prevented.

DETAILED DESCRIPTION OF THE PREFERRED EMBODIMENTS

Embodiment 1

Figure 1:
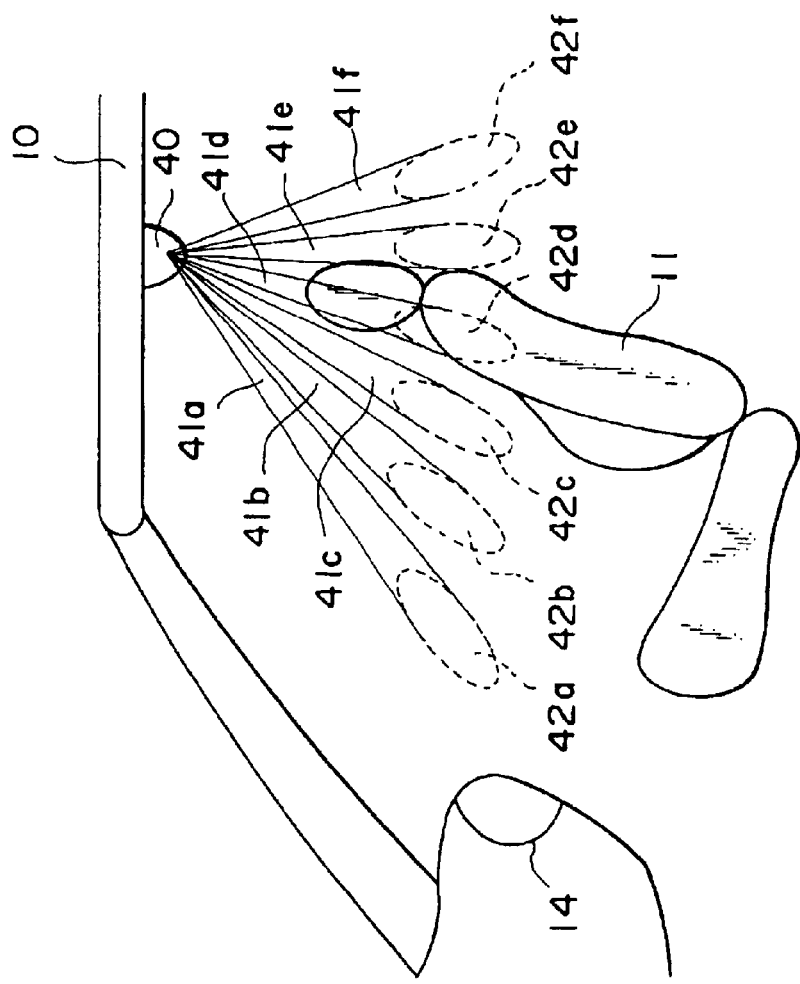
FIG. 1 is a side view showing a structure of an occupant detection system according to Embodiment 1 of the present invention.

An occupant detection system according to Embodiment 1 of the present invention will be described with reference to the drawings. FIG. 1 is a side view showing a structure of the occupant detection system according to Embodiment 1 which is mounted at a front passenger seat. Note that the identical symbols in the respective drawings indicate the identical or corresponding parts.

In FIG. 1, reference numeral 10 denotes a vehicle such as an automobile; 11, a front passenger seat (a seat) provided in the vehicle 10; 14, an air bag provided in a dashboard at the front passenger seat 11; and 40, a sensor main body of the occupant detection system.

The sensor main body 40 is provided on an approximately central ceiling of the vehicle 10 and includes six object detection sensors 20 inside the sensor main body 40, to thereby detect whether an object is present or absent in each of six object detection regions 42a to 42f arranged in alignment along a side surface of the vehicle 10. Note that the sensor main body may be mounted on the ceiling of the vehicle 10 substantially directly above the seat 11.

Figure 2:
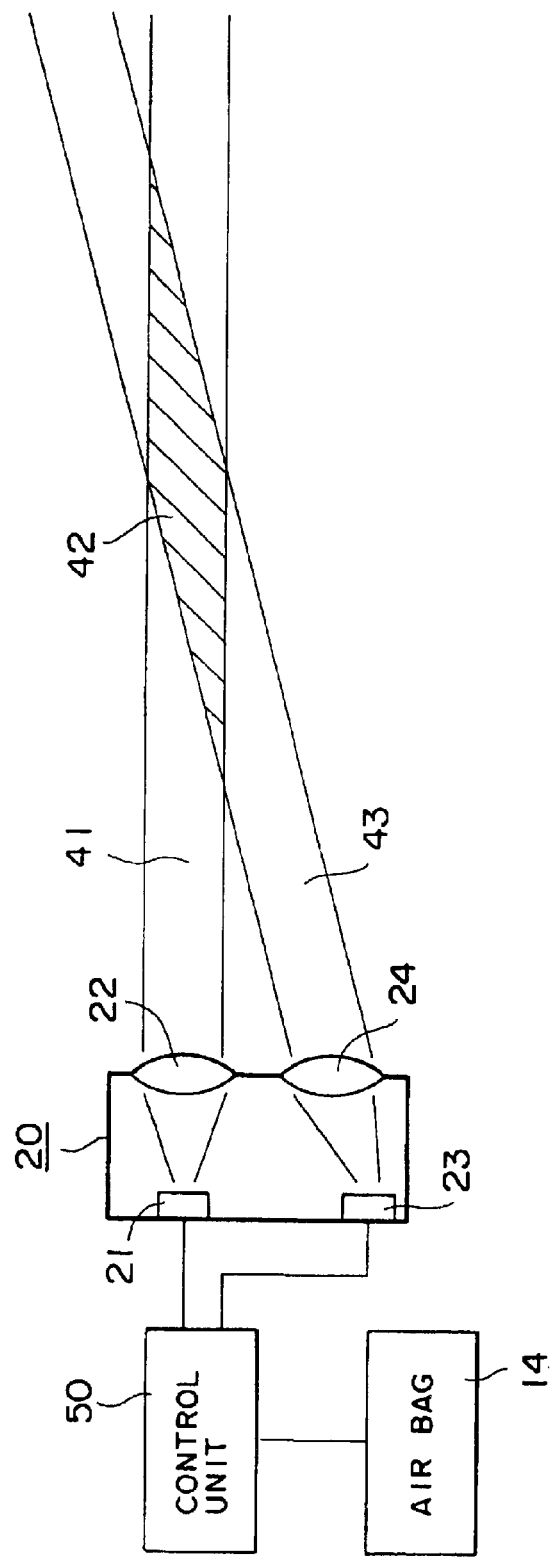
FIG. 2 shows a structure of an object detection sensor for the occupant detection system according to Embodiment 1 of the present invention.

FIG. 2 is a cross sectional view showing a structure of an object detection sensor for the occupant detection system according to Embodiment 1 of the present invention.

In FIG. 2, reference numeral 20 denotes an object detection sensor; 21, an LED for emitting infrared rays (a light emitting element); 22, a projection lens; 41, an infrared beam that is projected; 23, a light receiving element; 24, a lens; 43, a field of view of the light receiving element 23; and 42, an object detection region which is a portion where the infrared beam 41 and the field of view 43 of the light receiving element 23 intersect each other.

Also, in FIG. 2, reference numeral 50 denotes a control unit which is provided in the dashboard and includes a CPU and the like. The control unit 50 is connected to the light emitting elements 21 and the light receiving elements 23 provided in the six object detection sensors 20 and the air bag 14.

Next, an operation of the occupant detection system according to Embodiment 1 will be described with reference to the drawings.

In FIG. 2, based upon control by the control unit 50, if the infrared beam 41 irradiated from the LED 21 is hit against an object, a light spot develops on the object. If this light spot exits in the field of view 43 of the light receiving element 23, it can be detected by the light receiving element 23.

That is, only when the surface of the object exists in the region 42 where the infrared beam 41 and the field of view 43 of the light receiving element 23 intersect each other, the light receiving element 23 detects the light spot. Therefore, the object detection sensor 20 functions as the sensor that detects whether the object is present or absent in the object detection region 42 by utilizing the principle of the optical triangulation.

In FIG. 1, the six object detection sensors 20 irradiate the infrared beams 41a to 41f from the vicinity of the central ceiling of the vehicle 10 downward and outward in a diagonal directions avoiding a headrest of the seat 11, so as to be able to detect whether the object is present or absent in the object detection regions 42a to 42f.

The object detection regions 42a to 42f are arranged in alignment along the seat 11 such that, even in the case where the seat back cushion of the seat 11 exists in any position within a recognition range, the seat back cushion of the seat 11 can be detected in less than three of these object detection regions 42, and in the case where the occupant is present in the seat, the object can be detected in three or more of these object detection regions 42. Therefore, the control unit 50 can detect whether the occupant is present or absent with a simple process of counting the number of the regions 42 where the object is detected.

For example, based upon outputs form the six object detection sensors 20, when the number of the object detection regions 42 where the object is detected is three or more, the control unit 50 determines that the occupant is present in the seat and, in the case of a frontal collision of the vehicle 10, expands the air bag 14 to protect the occupant.

Also, for example, based upon outputs form the six object detection sensors 20, when the number of the object detection regions 42 where the object is detected is less than three, the control unit 50 determines that the seat 11 is vacant and, in the case of the frontal collision of the vehicle 10, that is, even if an acceleration sensor (not shown) is operated, restrains the air bag 14 from expanding.

Note that, in Embodiment 1, the example where the number of the object detection sensors 20 is six (=N) and the threshold number of the object detection regions is three (=a) is shown. However, N and a should be appropriately changed depending on the object to be measured, and if the numbers thereof are increased, the measurement range or reliability improves in general.

Also, in Embodiment 1, six independent object detection sensors 20 each provided with the light emitting element 21 and the light receiving element 23 are used. However, the total number of the elements may be decreased by dividing light irradiated from one light emitting element into a plurality of light beams through a mirror, a beam splitter, or the like to irradiate the beams in a plurality of directions, or by providing one light receiving element with plural ranges of field of view.

Further, in Embodiment 1, the object detection regions 42 are formed by utilizing the principle of the optical triangulation. However, a distance sensor may be provided which is for measuring the distance to the object within the angular range of a given solid angle and below based upon an arbitrary principle, so that the region which is located within the measurement angular range and where the output of the distance sensor is allowed within a given range, may be the object detection region. That is, in the case where the distance detected by the distance sensor is a distance to the object detection region 42, similarly to the object detection sensor 20, it can be considered that the object is detected in the object detection region 42.

As described above, according to Embodiment 1, there is an effect in that the occupant detection system can be obtained which is excellent in mounting property and can detect whether the occupant is present or absent even without separately providing the seat position sensor.

Embodiment 2

Figure 3:
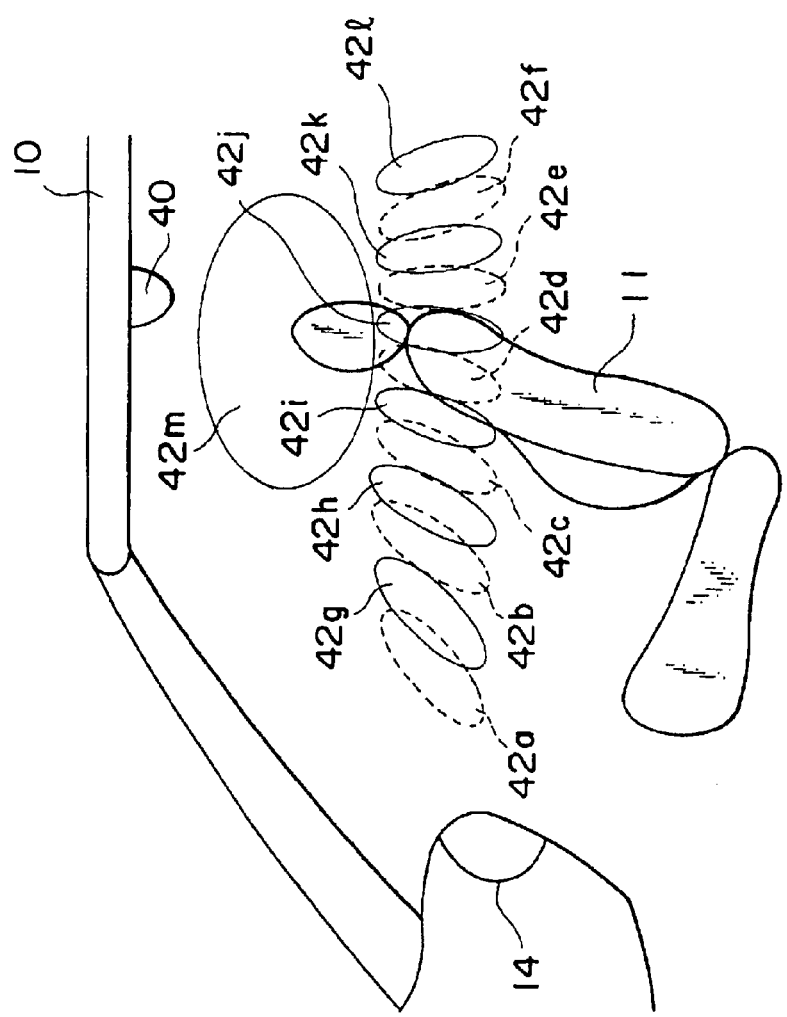
FIG. 3 is a side view showing a structure of an occupant detection system according to Embodiment 2 of the present invention.
Figure 4:
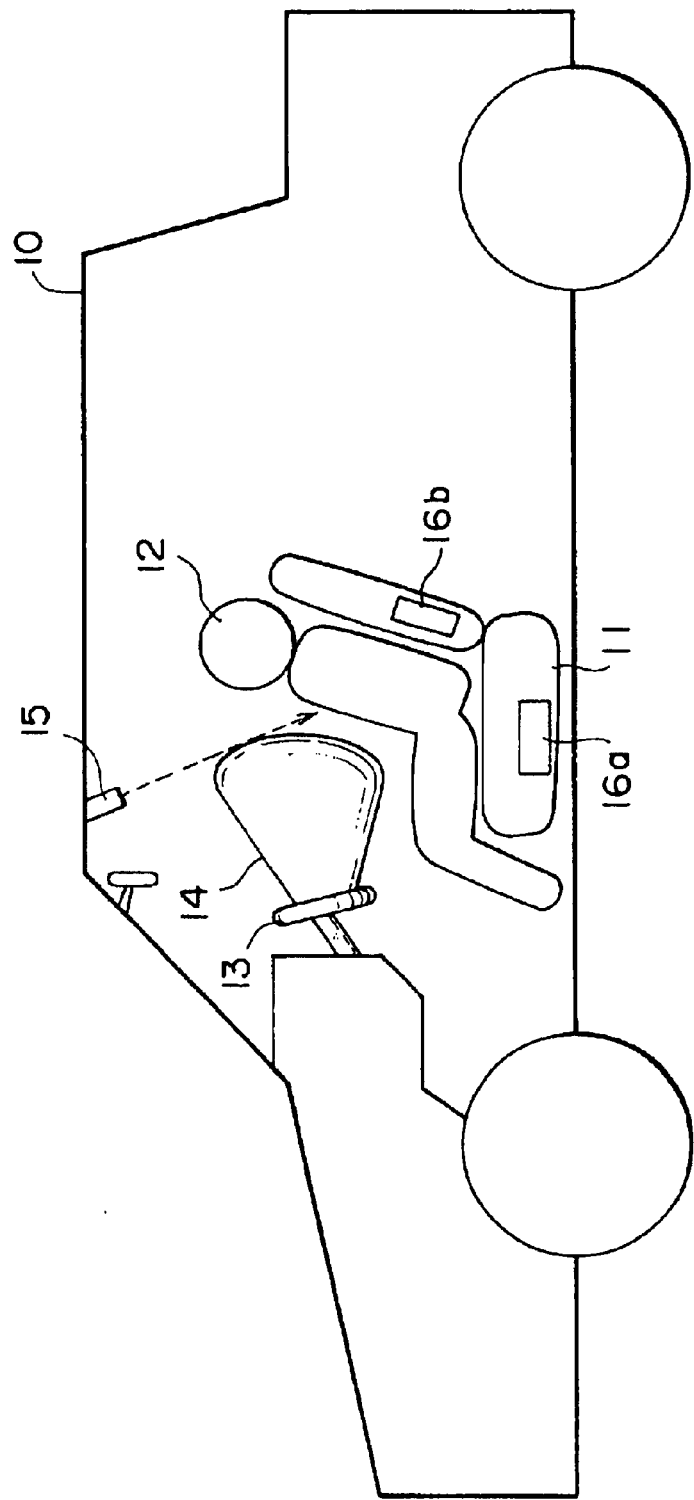
FIG. 4 is a side view showing a structure of a conventional occupant detection system.

An occupant detection system according to Embodiment 2 of the present invention will be described with reference to the drawings. FIG. 3 is a side view showing a structure of the occupant detection system mounted at a front passenger seat according to Embodiment 2.

In FIG. 3, similarly to Embodiment 1, symbols 42a to 42f denote six object detection regions structuring a first system. Symbols 42g to 42l denote six object detection regions structuring a second system which are arranged such that positional phases thereof are shifted with respect to those of the first system. Symbol 42m denotes a fail judgment object detection region which is provided between the sensor main body 40 and the original object detection regions 42a to 42l.

Next, an operation of the occupant detection system according to Embodiment 2 will be described with reference to the drawings.

Providing the two systems of the object detection regions 42a to 42f and 42g to 42l enables a fail judgment in the case of malfunction caused in one of the systems. That is, in the case where the detection outputs from the object detection sensors 20 of the two systems are the same, the control unit 50 determines that the two systems operate normally to perform the similar operation to Embodiment 1 described above. On the other hand, in the case where the detection outputs from the object detection sensors 20 of the two systems are different, the control unit 50 determines that one of the systems malfunctions and does not perform the operation of Embodiment 1 described above.

Also, arranging the two systems of the object detection regions 42a to 42f and 42g to 42l such that the positional phases thereof are shifted, eliminates a clearance between each of the object detection regions and can improve precision in detection.

As described above, according to Embodiment 2, there is an effect in that the occupant detection system can be obtained which is excellent in mounting property and can detect whether the occupant is present or absent even without separately providing the seat position sensor.

Embodiment 3

In Embodiment 1 and Embodiment 2 described above, in the case where an arm or the like of the occupant in a rear seat of the vehicle 10 is extended between the sensor main body 40 and the original object detection region 42, the sensor is blocked, which makes it impossible to detect the object in the original detection region 42. Thus, as shown in FIG. 3, the fail judgment object detection region 42m is arranged between the sensor main body 40 and the original object detection regions 42a to 42f and 42g to 42l, so that a fail is outputted in the above-described case. The same applies to the case of Embodiment 1 shown in FIG. 1.

That is, in the case where the detection outputted from the object detection sensors 20 having the object detection region 42m exists, the control unit 50 determines that there is a fear that the object detection sensors 20 having the object detection regions 42a to 42f and 42g and 42l malfunction and does not perform the operation of Embodiment 1 described above.

What is claimed is:

1. An occupant detection system comprising:

a sensor for detecting an object in a plurality of predetermined regions by irradiating a plurality of light beams with different predetermined inclination angles toward a seat direction, the sensor being mounted to a ceiling of a vehicle; and a control unit which, based upon a detection output of the sensor, determines that the seat is vacant if the number of the predetermined regions where the object is detected is below a predetermined number and determines that an occupant is seated in the seat if the number of the predetermined regions where the object is detected is the predetermined number or more; and wherein the sensor is a first object detection sensor composed of a light emitting element that irradiates an infrared beam and a light receiving element having a field of view that intersects the infrared beam; and each of the predetermined regions is a first object detection region in which the infrared beam and the field of view intersect each other.

2. An occupant detection system according to claim 1, wherein the first object detection sensor irradiates a plurality of infrared beams from one light emitting element.

3. An occupant detection system according to claim 1, wherein the light receiving element has a plurality of fields of view.

4. An occupant detection system according to claim 1, further comprising a second object detection sensor which has a second object detection region between each of the first object detection regions, the second object detection sensor being mounted to the ceiling of the vehicle.

5. An occupant detection system comprising:

a first object detection sensor for detecting an object in a plurality of first object detection regions by irradiating a plurality of infrared light beams with different predetermined inclination angles toward a seat direction, the sensor being mounted to a ceiling of a vehicle;

a second object detection sensor for detecting the object in a plurality of second object detection regions whose positional phases are shifted with respect to the plurality of the first object detection regions by irradiating a plurality of infrared beams with different predetermined inclination angles toward the seat direction, the second object detection sensor being mounted to the ceiling of the vehicle; and a control unit which, if detection outputs from the first and second object detection sensors are different, determines that one of the first and second object detection sensors malfunctions.

6. An occupant detection system according to claim 5, further comprising a third object detection sensor which has a third object detection region between the first and second object detection sensors and the plurality of the first and second object detection regions, the third object detection sensor being mounted to the ceiling of the vehicle.

* * * * *